INVENTORS
HOLLIS N. WHITE
MAX KENNETH BIERY

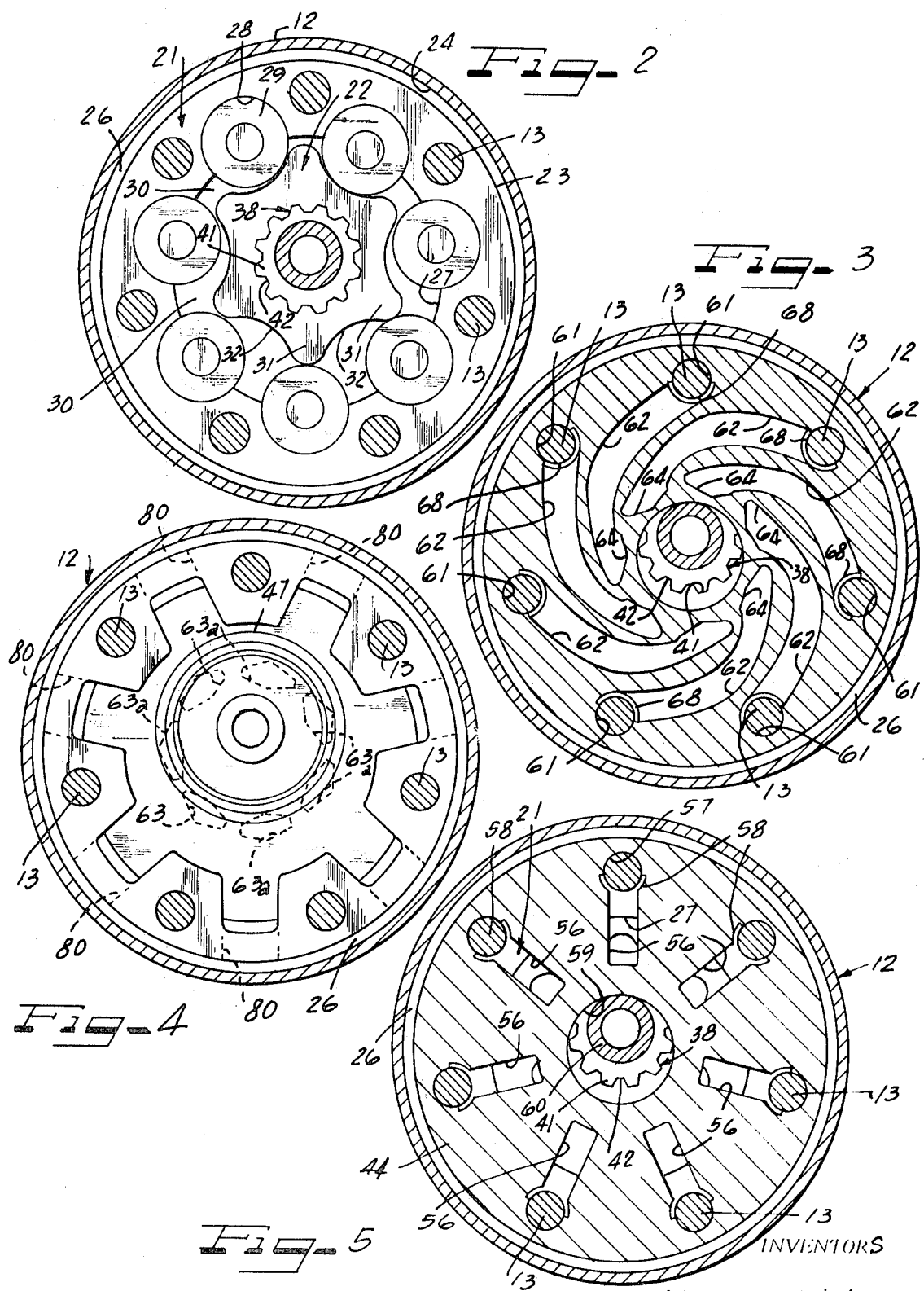

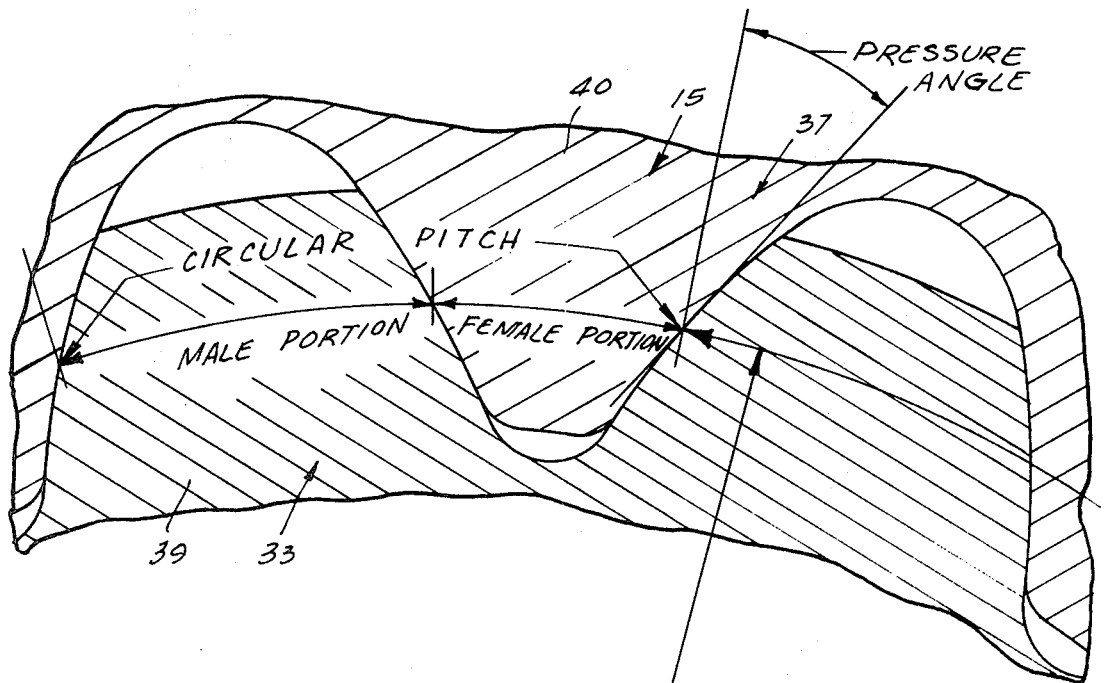

United States Patent Office 3,606,601
Patented Sept. 20, 1971

3,606,601
HYDRAULIC DEVICE
Hollis N. White, Jr., West Lafayette, and Max K. Biery, Lafayette, Ind., assignors to TRW Inc., Cleveland, Ohio
Filed Oct. 21, 1969, Ser. No. 868,151
Int. Cl. F01c 1/02, 1/42
U.S. Cl. 418—61　　　　　　　　　　　　　　1 Claim

ABSTRACT OF THE DISCLOSURE

A hydraulic device having a gerotor gear set including a pair of gears one of which rotates and orbits relative to the other, a work shaft rotatable on a fixed axis and an intermediate or wobble shaft interconnecting said one gear and said work shaft for joint rotation. The wobble shaft is connected to said one gear and to said work shaft by spline connections the male tooth portions of which comprise more than fifty percent and no more than sixty percent of the circular pitches thereof.

BACKGROUND OF THE INVENTION

This invention relates generally to the field of hydraulic gear pumps and motors and more particularly to such devices which utilize a gerotor gear set as the gear arrangement which acts upon or is acted upon by the fluid passing through the device.

Certain hydraulic devices which are used as pumps or motors or simply as metering units and which incorporate gerotor gear sets are known in the prior art. For example, many power steering systems of the hydrostatic type include devices of this general category.

By gerotor gear set is meant a pair of gears one of which is internally toothed and the other of which is externally toothed and disposed within and having one less tooth than the former, with respect to which it rotates and orbits as the gear set is operated.

The hydraulic devices contemplated herein include a work shaft rotatable on a fixed axis and connected for joint rotation with the rotatably and orbitally movable gear member. The work shaft may transmit work to the gear set in the case of a hydraulic pump, may transmit work from the gear set in the case of a hydraulic motor and may merely operate a counter or the like indicator in the case of a metering unit.

In order to connect the work shaft and the rotating and orbiting gerotor gear member an intermediate shaft is disposed therebetween, on both ends of which are formed spline teeth. Cooperating spline teeth are also formed on the work shaft and on the connected gear member.

Since the end of the intermediate or wobble shaft connected to the work shaft only rotates but the other end connected to the gear member rotates and orbits, the wobble shaft generates a conical surface during operation of the gerotor gear set. The teeth of the spline connections formed on the wobble shaft or else on the connected work shaft and gear member are curved in an axial direction to accommodate the conical movement of the wobble shaft, and such spline connections are referred to herein as conical spline connections. An example of a conical spline connection is shown in Hollis N. White, Jr. U.S. Pat. No. 3,452,680, wherein the outer surfaces of the teeth 36 and 38 formed on the wobble shaft 33 are curved in an axial direction.

Because of this peculiar configuration of the teeth of coniflex spline connection the torque transmitting capabilities of hydraulic motors and pumps using gerotor gear sets is relatively limited as compared with gear pumps and motors utilizing other types of gears. Nevertheless many other advantages accrue to the use of gerotor gears, including mechanical advantage in the case of a motor, and increased flow rate in the case of a pump, since the relatively orbitally movable gear member orbits "$n$" times each time it rotates about its axis, "$n$" being equal to the number of teeth formed on the externally toothed orbitally movable gear member.

The present invention has for one of its objectives an increase in the torque transmitting capabilities of the wobble shaft as a consequence of an improved conical spline connection.

SUMMARY OF THE INVENTION

The present invention may be summarized as comprising a hydraulic device of the general type described in which the male tooth portion of the circular pitch of the coniflex spline connection is more than fifty percent and no more than sixty percent of the total circular pitch thereof.

The invention may be otherwise summarized as a conical spline connection in the art association of a gerotor gear motor-pump assembly comprising a spline connection the male and female portion of the circular pitch of which being such that the stresses to which the loaded male teeth on the wobble shaft are subjected are compressive and have pressure angles of less than 45°.

Otherwise summarized, the invention comprises a gerotor gear set, a work input-output shaft and a wobble shaft, the wobble shaft being connected to the work input-output shaft and to the gerotor gear set by spline connections the circular pitches of which being such that the loaded female teeth thereof are placed in a state of compression.

By virtue of the invention the male teeth of the conical spline connection, curved in a longitudinal or axial direction to accommodate the movement of the wobble shaft as it rotates and simultaneously orbits to generate a conical surface, are strengthened to render the same capable of transmitting greater torque.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OF THE DRAWING

FIGS. 2–5 are sectional views taken respectively along lines II–V of FIG. 1.

FIG. 6 is an enlarged fragmentary sectional view of a coniflex spline connection of the present invention taken along lines VI—VI of FIG. 1.

DESCRIPTION OF THE PREFERRED EMBODIMENT

Figure 1:
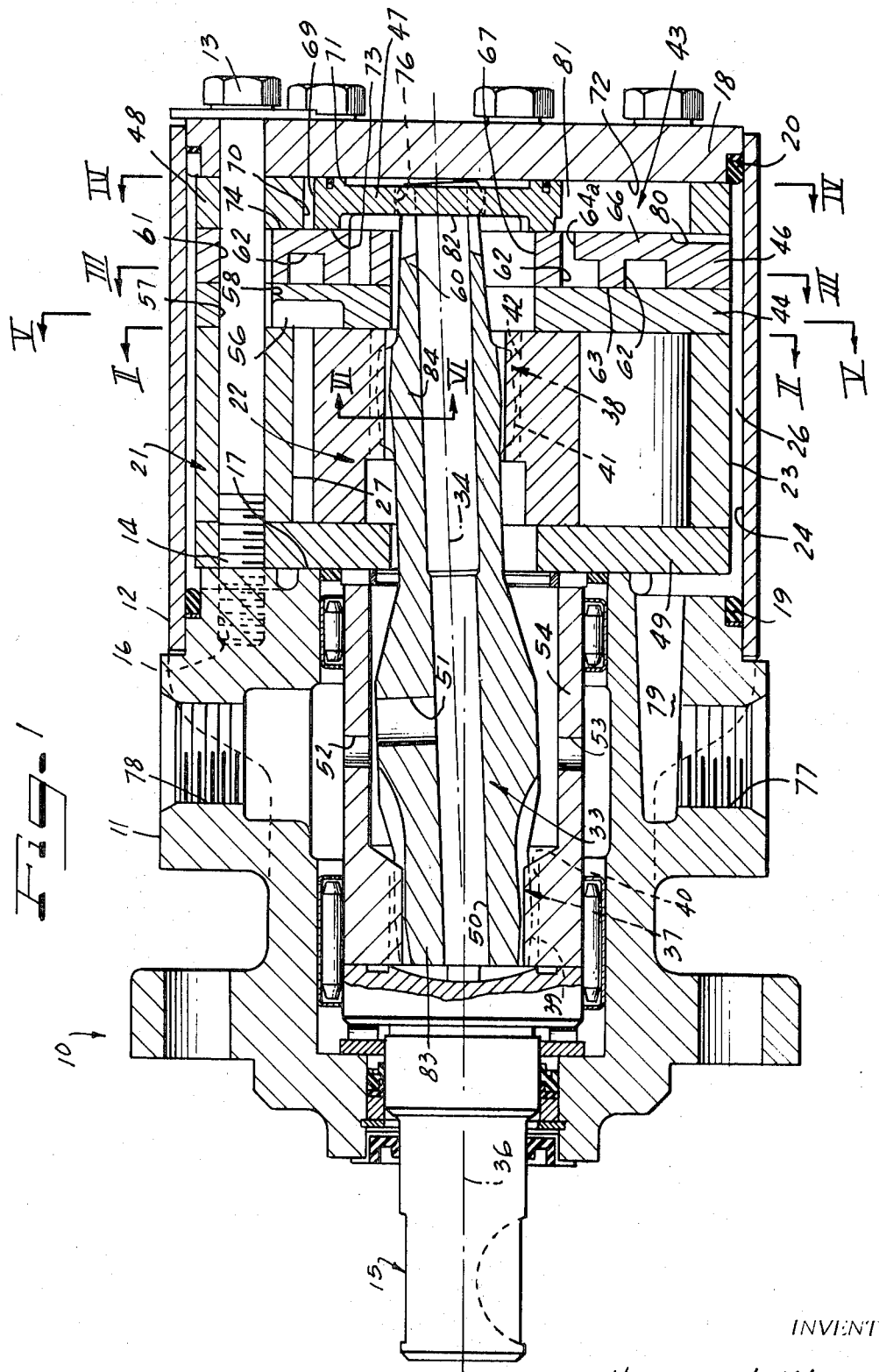
FIG. 1 is a cross-sectional view of a hydraulic motor-pump device which incorporates the principles of the present invention.

Referring to the drawings, a hydraulic motor-pump device constructed in accordance with the principles of the present invention is indicated generally at reference numeral 10 and comprises a housing 11 and a cylindrical casing 12 which extends axially from the housing 11 to enclose a stack-up of parts retained in assembly within the body 11 and the casing 12 by means of a plurality of bolts 13. Each of the bolts 13 comprises a threaded shank 14 received in a correspondingly threaded bore 16 formed in an end wall 17 of the housing 11. A cover plate 18 closes an end of the device 10 and a pair of O-ring members 19 and 20 form seals between the housing 11, the casing 12 and the cover plate 18.

Disposed within the casing 12 is a pair of fluid displacement members of a gerotor gear set which during the operation thereof form contracting and expanding fluid pockets for pumping chambers. The gerotor gear set may be more particularly characterized as comprising an internally lobed or toothed stator 21 and an externally toothed star or rotor 22. The stator 21 comprises a cylindrical peripheral wall 23 spaced radially from an inner wall 24 of the casing 12 to provide an annular space or passageway 26 therebetween.

The stator 21 is centrally apertured to provide an inner wall 27 in which is formed in radially angularly spaced relation a series of recesses 28 in each of which is disposed a cylindrical vane 29, the vanes together comprising the internal lobes or teeth of the stator 21. Spaces 30 between the vanes 29 comprise the fluid pockets or chambers which alternately expand and contract upon operation of the rotor 22 to provide fluid influx and deflux.

The rotor 22 comprises a plurality of lobes or teeth 31 which in number equal one less than the number of teeth 29 of the stator 21. Wall sections 32 which interconnect pairs of adjacent teeth 31 correspond in curvature generally with the outer surfaces of the teeth 29.

The axis of the rotor 22 is offset with respect to the axis of the stator 21 such that movement of the rotor 22 with respect to the stator 21 is simultaneously rotational and orbital, as will be understood by those skilled in the art.

A work input-output shaft 15 is journalled for rotation in the housing 11 about an axis which is aligned with the stationary axis of the stator 21. The shaft 15 is adapted for connection to a motor or the like when the device 10 is being utilized as a pump, and to a driven member such as a wheel or the like when the device 10 is being utilized as a hydraulic motor. The shaft 15 is connected to the rotor 22 by means of a wobble shaft indicated generally at reference numeral 33. The wobble shaft 33 has a longitudinal axis 34 which is disposed at an angle to the axis of the work input-output shaft 15, indicated at reference numeral 36.

In order to drivingly interconnect the shaft 15 and the rotor 22, a pair of spline connections indicated generally at reference numerals 37 and 38 are provided adjacent upper ends of the shaft 33. The spline connection 37 comprises a series of male teeth 39 formed on the shaft 33 and a complemental series of female teeth 40 formed on the work input-output shaft 15. Similarly the spline connection 38 comprises a series of male teeth 41 formed on the rotor shaft 33 and a complemental series of female teeth 32 formed on the rotor 22. The male teeth 39 and 41 formed on the shaft 33 are curved in an axial direction to accommodate conical movement of the wobble shaft 33 and thus the spline connections 37 and 38 are conveniently referred to herein as coniflex spline connections.

In order to direct fluid to and from the fluid pockets 30 in timed relation to the orbital and rotational movement of the rotor 22 with respect to the stator 21, the hydraulic device 10 includes a commutation valving arrangement indicated generally at reference numeral 43.

More particularly, the arrangement 43 comprises a pair of stationary valve plates 44 and 46 which may be referred to, respectively, as an intermediate plate and a manifold plate.

The commutation valving arrangement 43 further comprises a movable commutator valve plate 47 radially surrounded by a stationary plate 48 situated between the cover plate 18 and the manifold plate 46. The plate 44 is disposed between the manifold plate 46 and one end of the stator 21 and of the rotor 22. A clamping plate 49 is located at the opposite end of the stator 21 and rotor 22 and, by virtue of the bolts 13, the clamping plate 49, the stator 21, the intermediate plate 44, the manifold plate 46, the adjacent plate 48 and the cover plate 18 are connected in fixed assembly with the housing 11 and the casing 12. The annular passageway 26 extends immediately adjacent the inner wall 24 of the casing 12 from the cover plate 18 to the end wall 17 of the housing 11. Other flow passageways are provided by bores 50 and 51 formed in the wobble shaft 33 and by bores 52 and 53 formed in a tubular extension 54 of the work input-output shaft 15.

Referring to FIG. 5, the intermediate plate 44 has formed therein a plurality of radial flow pasageways 56 which correspond in number to the number of fluid chambers 30 as well as to the number of clamping bolts 13 and axial bores 57 formed in the plate 44 to receive the bolts 13. Each of the passageways 56 communicates with its corresponding bore 57 and each of the bores 57 is oversized at an inner portion thereof as indicated at reference numerals 58. Plate 44 is also centrally apertured as at 59 to receive a nose portion 60 of the wobble shaft 33.

The passageways 56 formed in the plate 44 extend radially inwardly of the inner wall 27 of the stator 21 so that the fluid pockets 30 are in fluid commutation therewith.

Referring to FIG. 3, the manifold plate 46 also comprises a series of axial bores 61 for receiving the clamping bolts 13. Plate 46 also comprises a plurality of curved grooves 62 formed in a radial face 63 thereof extending respectively in a radially inwardly directed path from a corresponding bore 61 to a distal end 64 which communicates with an axial passage $64_a$ extending to an opposite face 66 of the plate 46. The passages $64_a$ are disposed in a circular pattern about a concentric bore 67 extending axially through the plate 46 to receive the nose portion 60 of the wobble shaft 33. A radially inner portion 68 of each of the bores 61 is enlarged to provide an axial flow path through the plate 46.

Referring to FIGS. 1 and 4, the commutator valve plate 47 is generally cylindrically shaped and comprises a peripheral wall 69 having a diameter substantially less than the diameter of an inner wall 70 of the plate 48 circumjacent thereto. A radial face 71 of the valve plate 47 slidingly engages an end wall 72 of the cover plate 18 while an opposite face 73 engages an adjacent wall 74 of the manifold plate 46. A central bore 76 of the commutator valve plate 47 receives the end of the nose portion 60 of the wobble shaft 33 to provide orbital movement of the valve plate 47 in synchronism with the orbital movement of the wobble shaft 33 and the rotor 22.

When the hydraulic device 10 is operated as a motor to rotatably drive the input-output shaft 15, a source of pressurized fluid is connected to either one of fluid openings 77 or 78 formed in the housing 11. The opening 77 or 78 to which the pressurized fluid is connected determines the direction of rotation of the shaft 15.

Assuming that the fluid opening 77 is that which is connected to the source of pressurized fluid, the fluid passes to a chamber 79 from which it flows into the annular flow passageway 26 immediately inside the casing 12. The fluid then flows through a series of radially extending grooves 80 formed in the end wall 74 of the manifold plate 46 and then into a chamber 81 surrounding the commutator valve plate 47.

Regardless of the position of the commutator valve plate 47, at least one of the flow passageways $64_a$ formed in the manifold plate 46 communicates with the chamber 81 and directs pressurized fluid through its respective elongated passageway 62 to the passages 68 and 58 communicating therewith. The fluid then flows through a corresponding passageway 56 into the fluid chamber or pocket 30 communicating therewith. Pressurization of one or more of the fluid chambers 30 in any position of the rotor 22 imparts a rotating force to the rotor in one direction of rotation, such direction being counterclockwise as the rotor 22 is viewed in FIG. 2.

Each of the fluid chambers 30 in communication with pressurized fluid is expanded as a consequence of the resultant orbital and rotational movement of the rotor 22, whereas the flow chambers 30 which are not in direct communication with the pressurized fluid are reduced in size as a consequence of the movement of the rotor 22.

The fluid which is discharged from the contracting pockets 30 is directed through associated radial passages 56 formed in the intermediate plate 44 and thence through passages 58 and 68 to the appropriate curved passageways 62. The fluid then flows in the associated passages $64_a$ formed at the distal ends of passages 62 and then through a recess 82 formed in the commutator valve plate 47. From the recess 82 the fluid flows into the passageway 50 formed in the wobble shaft 33, thence through the radial passage 51 formed in the wobble shaft 33 and the radial passage 52 formed in the tubular extension 54 of the drive shaft 33 and thence through the fluid opening 78 formed in the housing 11.

As will be understood by those skilled in the art one end 83 of the wobble shaft 33 which is connected to the input-output shaft 15 rotates only, whereas an opposite end 84 which is connected to the rotor 22 both rotates and orbits in synchronism with the identical movement of the rotor 22. In the embodiment illustrated the stator 21 has seven lobes or teeth 29, whereas the rotor 22 has six teeth. Thus, for each revolution thereof, the rotor 22 will move through an orbital path of travel six times. The wobble shaft 33 also orbits or moves through a conical path of travel about the end 33 thereof at the orbital speed of the rotor 22.

Since the commutator valve plate 47 is coupled to the nose 60 of the wobble shaft 33, it is also orbited at the orbital speed of the rotor 22 and alternately and sequentially communicates the passageways $64_a$ with the chamber 81 and with the valve recess 82 as it orbits in timed relation to the orbital movement of the rotor 22, whereby the fluid pockets or chambers 30 sequentially and alternately expand under the driving force of the pressurized fluid and then contract to express the fluid therefrom. Since the wobble shaft 33 is coupled to the work input-output shaft 15, it rotates the shaft 15 at the rotational speed of the rotor 22. Operation of the hydraulic device 10 and rotation of the shaft 15 will continue as long as fluid opening 77 commutates with a source of pressurized fluid.

In order to reverse the direction of rotation of the shaft 15, it is only necessary to connect the fluid opening 78 to the source of pressurized fluid and the fluid opening 77 to the low pressure side of the fluid circuitry. The pressurized fluid will then flow through the hydraulic device 10 in a direction opposite to that described hereinabove causing the rotor 22 to rotate in a clockwise direction as it is viewed in FIG. 2.

When the hydraulic device 10 is being utilized as a hydraulic pump, the shaft 15 is connected for rotation to any suitable driving motor and fluid will be pumped through the device 10 between the fluid openings 77 and 78 in a direction which depends upon the direction of rotation of the shaft 15.

As a consequence of the rotational and orbital movement of the wobble shaft 33 the longitudinal extent of each of the male teeth of spline connections 37 and 38 in contact with its corresponding female teeth is less than that which would otherwise occur in a conventional spline connection. The reduced contact area increases the stress to which the male teeth are subjected as contrasted with the male teeth of a conventional spline connection for any given load.

In addition, the convex curvature of the outer surfaces of the male teeth of spline connections 37 and 38 which is necessitated by the conical movement of the wobble shaft 33 further reduces the strength of the male teeth of the spline connections. To increase the strength and load capabilities of the spline connections 37 and 38 without increasing the diameters thereof is an important object of the present invention.

Referring to FIG. 6, the diameter of the pitch circle of the spline connection 37 is such that the male portion of the circular pitch thereof is greater than the female portion. We have discovered that the strength of the male teeth are increased when the male portion is greater than 50% but not greater than 60% of the circular pitch. Within this range the male teeth under load are subjected to bending stresses with pressure angles of less than 45° and the female teeth under load are placed in a state of compression. As a consequence the torque-transmitting capabilities of the conical spline connection is substantially increased.

In the preferred embodiment both conical spline connections 37 and 38 are constructed such that the male portions of the circular pitches thereof comprise more than 50 but not more than 60% of the total circular pitches. It should be appreciated, however, that the principles of the present invention may be advantageously embodied in either one of the spline connections even though the other spline connection may be constructed so that the male and female portions of the circular pitch are equal. The present invention provides a substantial increase in the load-carrying capabilities of the conical spline connections without an increase in the diameters thereof and thereby increases the fluid acceptable working pressure ranges and work load capabilities in connection with which the hydraulic motor-pump unit 10 may be utilized.

What we claim is:
1. A hydraulic device comprising
   a gerotor gear set having a pair of meshing gears one of which rotates on an axis which orbits about a stationary axis of the other gear while maintaining a parallel relationship therewith,
   a work input-output shaft rotatable on a fixed axis which is parallel to but offset from the stationary axis of said other gear,
      a wobble shaft between said one gear and said work input-output shaft,
      first coupling means formed on said one gear and at one end of said wobble shaft for connecting the two for joint rotational and orbital movement, and
      second coupling means formed at the other end of said wobble shaft and on said work input-output shaft for connecting the two for joint rotational movement, said first and second coupling means each comprising a spline connection the wobble shaft male tooth portion of which comprises between 50 and 60% of the total circular pitch thereof and being such that the stresses to which the loaded male teeth on the wobble shaft are subjected are compressive and have pressure angles of less than 45°.

References Cited

UNITED STATES PATENTS

| | | | |
|---|---|---|---|
| 3,174,302 | 3/1965 | Pomper | 64—9 |
| 3,232,075 | 2/1966 | Wildhaber | 64—9 |
| 3,452,680 | 7/1969 | White, Jr. | 418—61 |

CARLTON R. CROYLE, Primary Examiner

W. J. GOODLIN, Assistant Examiner